United States Patent
Dong

(10) Patent No.: US 12,439,466 B2
(45) Date of Patent: Oct. 7, 2025

(54) MULTI-LINK COMMUNICATION METHOD AND COMMUNICATION DEVICE

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 358 days.

(21) Appl. No.: 18/003,770

(22) PCT Filed: Aug. 14, 2020

(86) PCT No.: PCT/CN2020/109299
§ 371 (c)(1),
(2) Date: Dec. 29, 2022

(87) PCT Pub. No.: WO2022/032662
PCT Pub. Date: Feb. 17, 2022

(65) Prior Publication Data
US 2023/0262800 A1 Aug. 17, 2023

(51) Int. Cl.
*H04W 76/15* (2018.01)
*H04W 48/08* (2009.01)

(52) U.S. Cl.
CPC ........... *H04W 76/15* (2018.02); *H04W 48/08* (2013.01)

(58) Field of Classification Search
None
See application file for complete search history.

(56) References Cited

U.S. PATENT DOCUMENTS 11,778,645 B2 * 10/2023 Patil ............... H04W 40/244
370/329
2019/0082373 A1 3/2019 Patil et al.

FOREIGN PATENT DOCUMENTS

| CN | 104221464 A | 12/2014 | |
| CN | 104718777 A | 6/2015 | |
| EP | 2803223 B1 * | 10/2018 | ......... H04L 25/0204 |
| JP | 2015513287 A | 4/2015 | |
| WO | WO 2016010001 A1 | 1/2016 | |

OTHER PUBLICATIONS

International Search Report and Written Opinion of International Application No. PCT/CN2020/109299, mailed Apr. 30, 2021, 14 pages.

(Continued)

*Primary Examiner* — Hong S Cho
(74) *Attorney, Agent, or Firm* — Finnegan, Henderson, Farabow, Garrett & Dunner, L.L.P.

(57) ABSTRACT

The present invention provides a multi-connectivity communication method and device. The communication method comprises: determining a first message frame in one connection, wherein the first message frame comprises a change sequence field, and a value of the change sequence field is used for indicating quiet information of multiple connections; and sending the first message frame in at least one connection of the multiple connections. The technical solution provided in embodiments of the present invention can reduce signaling overhead, so that the device performs communication in multiple connections, and network throughput is improved.

14 Claims, 3 Drawing Sheets

(56) References Cited

OTHER PUBLICATIONS

Notice of Reasons for Refusal for Japanese Application No. 2022-581685, issued on Sep. 26, 2023.
Examination Report for India Application No. 202347002608, issued on Oct. 10, 2023, 5 pages.
Extended European Search Report Issued in Application No. 20949160.4 dated Apr. 9, 2024, 9 pages.
Patil, A. et al., "MLO Indication of Critical Updates", doc.: IEEE802.11-20/0586r5, Qualcomm, Apr. 2020, 19 pages.

* cited by examiner

MULTI-LINK COMMUNICATION METHOD AND COMMUNICATION DEVICE

CROSS-REFERENCE TO RELATED APPLICATION

This application is a U.S. national phase application of International Application No. PCT/CN2020/109299, filed on Aug. 14, 2020, the content of which is hereby incorporated by reference in its entirety.

TECHNICAL FIELD

The disclosure relates to the field of communication and provides a multi-link communication method and a multi-link communication apparatus.

BACKGROUND

In May, 2018, Institute of Electrical and Electronic Engineers (IEEE) established Study Group (SG) IEEE802.11be to study the next generation of Wi-Fi technology (i.e., IEEE802.11a/b/g/n/ac). The scope of the research includes 320 MHz bandwidth transmission, and aggregation and cooperation of multiple frequency bands. The research expects to increase the rate and throughput by at least four times relative to the existing IEEE802.11ax standard, and its main application scenarios are video transfer, Augmented Reality (AR), and Virtual Reality (VR).

The aggregation and cooperation of multiple frequency bands refers to simultaneous communications between devices in 2.4 GHz, 5.8 GHz and 6-7 GHz frequency bands, and a new Media Access Control (MAC) mechanism needs to be defined to manage the communications. In addition, a low latency transmission is expected to be supported in the IEEE802.11be standard.

SUMMARY

The multi-link communication method performed by an access point (AP) is provided according to some embodiments of the disclosure. The method includes: determining a first message frame, in which the first message frame includes a change sequence field, and a value of the change sequence field is configured to indicate quiet information for a plurality of links; and sending the first message frame on at least one link of the plurality of links to at least one station (STA).

According to some embodiments of the disclosure, a multi-link communication method performed by a station (STA) is provided. The method includes:
receiving a first message frame on at least one link sent by at least one access point (AP), in which the first message frame includes a change sequence field, and a value of the change sequence field is configured to indicate quiet information for a plurality of links.

According to some embodiments of the disclosure, an electronic device is provided. The electronic device includes: a memory, a processor and computer programs stored on the memory and executable by the processor. When the computer programs are executed by the processor, the above method is implemented.

According to some embodiments of the disclosure, a computer readable storage medium having computer programs stored thereon is provided. When the computer programs are executed by a processor, the above method is implemented.

BRIEF DESCRIPTION OF THE DRAWINGS

The above and additional features of the embodiments of the disclosure will become more apparent by describing the embodiments of the disclosure in detail with reference to the accompanying drawings, in which.

DETAILED DESCRIPTION

Figure 1:
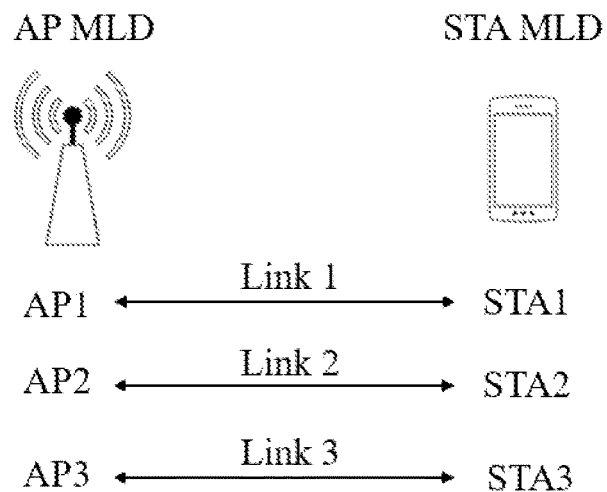
FIG. 1 is an exemplary schematic diagram of a multi-link communication scenario.

The following description with reference to the accompanying drawings is provided to fully understand the embodiments of the disclosure defined by the appended claims and their equivalents. The embodiments of the disclosure include various specific details, which are considered to be exemplary only. In addition, descriptions of well-known techniques, functions and structures may be omitted for the sake of clarity and brevity.

The terms and words used in this disclosure are not limited to their written meanings, but are used only by the inventors to enable a clear and consistent understanding of the disclosure. Accordingly, to those skilled in the art, the description of the embodiments of the disclosure is provided for illustrative purposes only, and not for limiting purposes.

It should be understood that, unless the context clearly indicates otherwise, the singular forms "a", "one", "said" and "the" used herein may also include plural forms. It should be further understood that the term "includes" as used in this disclosure refers to the presence of the described features, integers, steps, operations, components and/or assemblies, but does not exclude the presence or addition of one or more other features, integers, steps, operations, components, assemblies and/or groups thereof.

It is understood that while the terms "first" and "second" may be used herein to describe various elements, these elements should not be limited by these terms. These terms are used only to distinguish one element from another. Therefore, without departing from the teachings of the example embodiments, the first element discussed below may be referred to as the second element.

It should be understood that when the component is "connected" or "coupled" to another component, it may be directly connected or coupled to other components, or there may be an intermediate component. In addition, "connected" or "coupled" as used herein may include wirelessly connected or wirelessly coupled. The term "and/or" or the expression "at least one/at least one of . . . " as used herein includes any and all combinations of one or more relevant listed items.

Unless otherwise defined, all terms used herein, including technical terms and scientific terms, have the same meaning as generally understood by those skilled in the art to which this disclosure belongs.

In the discussion of IEEE802.11be standard, the maximum bandwidth supported is 320 MHz (160 MHz+160

MHz), and the IEEE802.11be standard may also support 240 MHz (160 MHz+80 MHz) and bandwidths supported in the IEEE802.11ax standard.

In the existing standard, if the multiple Basic Service Sets (BSSs) exist at the same time or the multiple BSSs are integrated at a single physical Access Point (AP), in order to avoid the probability of overlapping Basic Service Sets (OBSSs), the AP will maintain quiet in a quiet period and a quiet duration. In detail, the quiet period negotiation can be achieved based on the quiet period request element and the quiet period response element as shown below.

| Quiet Period Request Element Format | | | | | | | |
|---|---|---|---|---|---|---|---|
| Element ID | Length | Request Token | Quiet Period Offset | Quiet Period | Quiet Duration | Repetition Count | Target BSSID |
| Octet 1 | 1 | 2 | 2 | 4 | 2 | 1 | 6 |

| Quiet Period Response Element Format | | | | |
|---|---|---|---|---|
| Element ID | Length | Request Token | BSSID | Status Code |
| Octet 1 | 1 | 2 | 6 | 2 |

The quiet period request element defines a periodic sequence of quiet intervals for scheduling requested by a requester AP to a responder AP.

The quiet period response element defines the feedback information from the AP that has received the quiet period request element.

When the negotiation is completed, the AP broadcasts a result by a beacon frame or a probe response frame. In addition, the existing standard introduces a change sequence information element on a single link to identify a change of system information within a BSS.

The multi-link communication is supported in the IEEE802.11be standard, but the existing standard may not satisfy the requirements of a multi-link communication in the IEEE802.11be standard or other standards.

Therefore, embodiments of the disclosure provide multi-link communication methods, a multi-link communication apparatus, electronic devices and computer readable storage media. The technical solution provided in the embodiments of the disclosure can reduce a signaling overhead, and enable the devices to communicate in the multi-link communication, thereby improving a network throughput.

FIG. 1 is a schematic diagram of a multi-link communication scenario.

In a wireless local area network, one BSS includes an AP and one or more stations (STAs) that communicate with the AP. The BSS may connect to a Distribution System (DS) via the AP and then access another BSS to form an Extended Service Set (ESS).

The AP is a wireless switch used for a wireless network, which is a core of the wireless network. The AP device can be used as a wireless base station and is mainly used as a bridge to connect the wireless network and a wired network. The AP is used to integrate wired and wireless networks.

The AP may include software applications and/or circuits to enable other types of nodes in the wireless network to perform internal and external communication using the wireless network via the AP. In some examples, as an example, the AP may be a terminal device or a network device provided with a Wireless Fidelity (Wi-Fi) chip.

As an example, the STA may include, but is not limited to: a cellular phone, a smart phone, a wearable device, a computer, a Personal Digital Assistant (PDA), a Personal Communication System (PCS) device, a Personal Information Manager (PIM), a Personal Navigation Device (PND), a global positioning system, a multimedia device, and an Internet of Things (IoT) device.

In an example embodiment of the disclosure, the AP and the STA may support the multi-link communication. For ease of description, the following contexts mainly describe an example of an AP communicating with a STA on multiple links, but the example embodiments of the disclosure are not limited thereto.

In FIG. 1, as exemplary only, an AP Multi-Link Device (MLD) may represent an AP supporting the multi-link communication function and a STA MLD may represent a STA supporting the multi-link communication function. As shown in FIG. 1, the AP MLD may operate on three links, such as AN, AP2, and AP3 shown in FIG. 1, and the STA MLD may operate on three links, such as STA1, STA2, and STA3 shown in FIG. 1. In the example of FIG. 1, the AP1 communicates with the STA1 via Link 1. Similarly, the AP2 communicates with the STA2 via Link 2, and the AP3 communicates with the STA3 via Link 3. Moreover, Link 1 to Link 3 may be multiple links at different frequencies, e.g., a link at 2.4 GHz, a link at 5 GHz and a link at 6 GHz frequencies. In addition, each link may have multiple channels. However, it should be understood that the communication scenario shown in FIG. 1 is only exemplary and the disclosure concept is not limited thereto. For example, an AP MLD may be connected to one or more STA MLDs, or, an AP MLD may be connected to at least one STA that supports a single link (i.e., a STA that only supports the existing standard and may be referred to as: an old-style STA), or an AP may communicate with multiple STAs on different links.

As mentioned above, in order to identify the change of system information within a BSS, the change sequence information element is defined in the existing standard to identify the change of the system information, as shown in Table 1 below.

TABLE 1

| change sequence information element format | | |
|---|---|---|
| Element ID | Length | change sequence |
| Octet 1 | 1 | 1 |

The change sequence information element indicates the change of system information within a BSS. The Change Sequence field has 1 octet, which is defined as an unsigned integer and can be initialized to 0, and is increased when a critical update occurs to any of the elements in the beacon frame.

When a critical update occurs to any of the elements in the beacon frame, the AP will increase the value of the Change Sequence field (modulo 256) of the beacon frame to be sent next. The following events may classify as a critical update:
 a) inclusion of an extended channel switch announcement;
 b) modification of Enhanced Distributed Channel Access (EDCA) parameters; or
 c) modification of S1G operation element.

The multi-link communication means that an AP MLD will form a plurality of BSSs on different links, and the non-AP STA MLD will communicate with the AP MLD on multiple links. How to broadcast the AP quiet time for the BSSs formed by the same AP MLD to the Non-AP STA MLD needs to be defined. In the example embodiment of the disclosure, the AP MLD and the non-AP STA MLD may support the capability to send and/or receive simultaneously on multiple links at the same moment.

Figure 2:
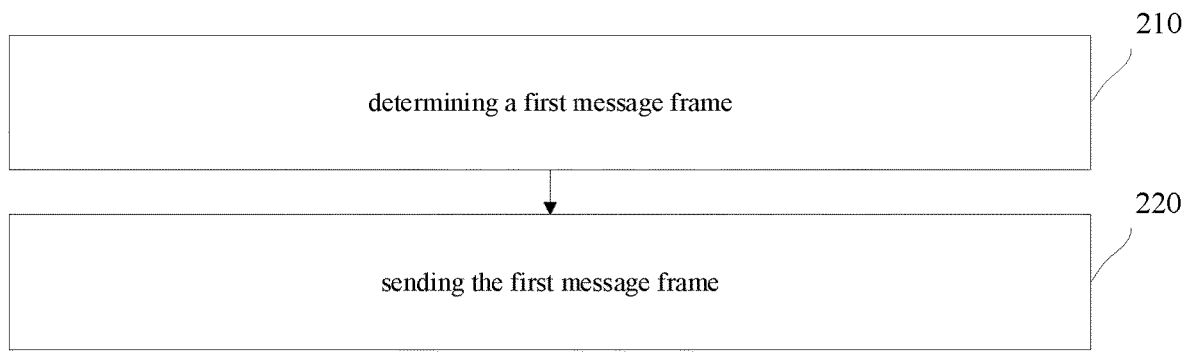
FIG. 2 is a flowchart of a communication method according to an example embodiment of the disclosure.

FIG. 2 is a flowchart of a communication method according to an example embodiment of the disclosure.

As shown in FIG. 2, at step 210, a first message frame may be determined. For example, the first message frame may be determined by the AP on one link of the multiple links supported by itself. In some examples, one or more links supported by the AP may be determined to send the first message frame. According to the example embodiment of the disclosure, the first message frame may be a beacon frame or a probe response frame broadcast by the AP, which is not limited in embodiments of the disclosure. The first message frame may be any other type of frame according to the communication environment. In an example embodiment, the first message frame may be determined based on the communication capability of the AP and the current communication environment. In another example embodiment, a pre-stored or pre-written first message frame may be obtained directly.

In the example embodiment of the disclosure, the first message frame (e.g., a beacon frame or a probe response frame) may include a change sequence field for indicating the quiet information for a plurality of links.

It is considered that an event update may occur when the quiet information of the AP has changed, and then the change of the quiet information for an AP can be represented by the change sequence field. The quiet information for the AP may include a quiet period or a quiet duration for the AP. That is, according to the example embodiment of the disclosure, the value of the change sequence field (e.g., the change sequence field shown in Table 2 below) may be set to a first value to indicate the change of the quiet information for an AP of multiple links (i.e., the change of the quiet period or the quiet duration for the AP of multiple links). An example of the change sequence field will be described in detail below with reference to Table 2.

At step 220, the first message frame is sent on at least one link of the plurality of links. That is, the change sequence field is sent on the at least one link by carrying the change sequence field in the first message frame.

In some examples, the change sequence field only indicates whether quiet information of the AP has changed, and the specific quiet information may be further notified to the receiver (e.g., the STA) via quiet time information (which may also be referred to as, the quiet time information element), which will be described in detail below with reference to FIG. 3 and FIG. 4.

Figure 3:
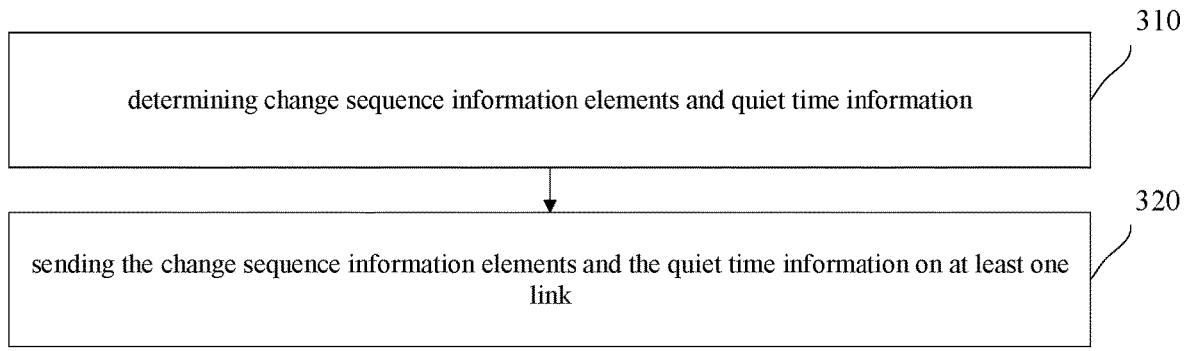
FIG. 3 is a flowchart of a communication method according to an example embodiment of the disclosure.

FIG. 3 is a flowchart of a communication method according to an example embodiment of the disclosure.

As shown in FIG. 3, at step 310, the change sequence information element and the quiet time information may be determined. For example, the change sequence information element and the quiet time information may be included in the first message frame (e.g., the beacon frame or the probe response frame). When the first message frame is determined at step 210 in FIG. 2, the change sequence information element and the quiet time information may also be determined. According to the example embodiment of the disclosure, the change sequence information element and the quiet time information may be carried in the same first message frame. In other examples, the change sequence information element and the quiet time information may be sent via the same first message frame. Or, the change sequence information element and the quiet time information may be carried in different first message frames. In other words, the change sequence information element and the quiet time information may be sent separately via different first message frames. As noted above, the examples of the first message frames are the beacon frame or the probe response frame, which is not limited in the disclosure.

According to the example embodiment of the disclosure, the change sequence information element may have the format as shown in Table 2 below.

TABLE 2 change sequence information element format

| Element ID | Length | change sequence | Link ID/Link set ID |
| --- | --- | --- | --- |

According to Table 2, the change sequence field described with reference to step 210 in FIG. 2 may be the Change Sequence field included in the change sequence information element. For example, when the value of Change Sequence field is set to "00000101", its value is 5, and the value modulo 256 is used to indicate that the quiet time information on the multiple links has changed.

In addition, according to the example embodiment of the disclosure, the change sequence information element may include a link ID. The link ID may correspond to a link with changed quiet information. In an example, the link ID may correspond to a single link (e.g., Link ID in Table 2). However, in another example, the link ID may correspond to a set of multiple links (e.g., Link set in Table 2).

In addition to identifying the change of the quiet information of the AP of multiple links by setting the value of the change sequence field to the first value as described at step 210 in FIG. 2, it is also possible to indicate, by the link ID, on which link or links the quiet information has changed.

In addition, considering that the change sequence information element shown in Table 2 is different from the related art (as shown in Table 1), the value of the Element ID is set to a value different from the value of the Element ID shown in Table 1, and thus a different value is set to indicate that the change sequence information element is a newly defined type of element to the receiver.

However, this is only exemplary and in other embodiments of the disclosure, the link ID may also be omitted, or the value of the Element ID in Table 2 may be the same as the value of the Element ID in Table 1.

The quiet time information determined at step 310 may have the format shown in Table 3 below.

TABLE 3

| | | | quiet time information | | | | |
|---|---|---|---|---|---|---|---|
| Element ID | Length | Quiet count | Quiet period | Quiet duration | Quiet offset | BSSID/ link ID | Time shifting to reference link | ... |

According to Table 3, the quiet time information may include a second link ID, such as link ID in Table 3. The second link ID may correspond to the link with changed quiet information. In some embodiments, the quiet time information may include a BSSID. The BSSID corresponds to the link with changed quiet information. The BSSID may indicate to which BSS the link with the changed quiet information belongs.

In addition, the quiet time information may include a time offset corresponding to a link for sending the quiet time information (e.g., Time shifting to reference link in Table 3), which may be used to represent a time difference between the link on which quiet occurs and the link on which the quiet time information is sent currently. For example, the link on which quiet occurs may be the Link 1 shown in FIG. 1 and a corresponding time is T1. If the quiet time information is sent on all three links (Link 1 to Link 3) shown in FIG. 1, the time offset field in the quiet time information sent on the Link1 may be 0; the time offset field in the quiet time information sent on the Link2 may be s1; and the time offset field in the quiet time information sent on the Link3 may be s2. That is, the time at which each of Link 1 to Link 3 send the quiet time information respectively may correspond to T1, T1+s1, and T1+s2, which is only exemplary and is not limited in the example embodiment of the disclosure. For example, the time offset field of the quiet time information may directly indicate the specific time corresponding to the link on which the quiet time information is sent.

In an example, one link of the multiple links supported by the AP may be set as a reference link (e.g., the link on which the quiet occurs or any other link). When the quiet time information is sent on at least one link, the time offset in the quiet time information on each link of the at least one link may indicate a time offset of each link relative to the reference link when sending the quiet time information, which is not limited in the example embodiments of the disclosure. For example, instead of setting a reference link, a reference time may be set, and then the time offset may correspond to a time offset of sending the quiet time information on each link relative to the reference time. In other words, when the quiet time information is sent on at least one link, the time offset in the quiet time information on each link of the at least one link may indicate a time offset of each link relative to the reference time.

In addition, the quiet time information may include an Element ID indicating the type of the quiet time information (i.e., the Element ID in Table 3). That is, in the example embodiment of the disclosure, the quiet time information (in the format shown in Table 3) sent at step 310 may be identified by the Element ID as a newly defined type.

In addition, the quiet time information may include at least one of the following fields: length, quiet count, quiet period, quiet duration or quiet offset. These fields are used to define specific information when the quiet information has changed, and their meanings are similar to those of the related art, so that only some of these fields are described briefly below.

The Quiet Count field is set to the number of target beacon transmission times (TBTTa) until the beacon interval during which the next quiet interval starts.

The Quiet Period field is set to the number of beacon intervals between the start of regularly scheduled quiet intervals defined by the quiet time element (which can also be called a new type of quiet element, as indicated in Table 3). A Quiet Period field set to 0 indicates that no periodic quiet interval is defined.

The Quiet Duration field is set to a duration of quiet intervals, expressed in units of Time Units (TUs).

The Quiet Offset field is set to the offset of the starts of the quiet intervals from the TBTT specified by the Quiet Count field, expressed in TUs. The value of Quiet Offset field may be less than one beacon interval.

As shown in FIG. 3, at step 320, the change sequence information element and the quiet time information may be sent on at least one link. That is, the quiet time information shown in Table 3 may be sent on the link on which the change sequence information element shown in Table 2 is broadcasted.

In the embodiment of the disclosure, the change sequence information element and the quiet time information may be sent on Link 1 or on other links, or the change sequence information element and the quiet time information may be sent on Link 1 only. In some possible embodiments, the change sequence information element and the quiet time information may also be sent on different links.

As shown at step 220 of FIG. 2, the first message frame (e.g., the beacon frame or the probe response frame) includes both the change sequence information element and the quiet time information, and both the change sequence information element and the quiet time information are sent on at least one link of the plurality of links. In some examples, when the change sequence information element and the quiet time information are not included in the same first message frame, e.g., when the change sequence information element and the quiet time information are included in different first message frames, a first message frame carrying the change sequence information element may be sent on at least one link (e.g., Link 1 and Link 2 shown in FIG. 1), and then another first message frame carrying the quiet time information is sent on the same link (e.g., Link 1 and Link 2 shown in FIG. 1).

Figure 4:
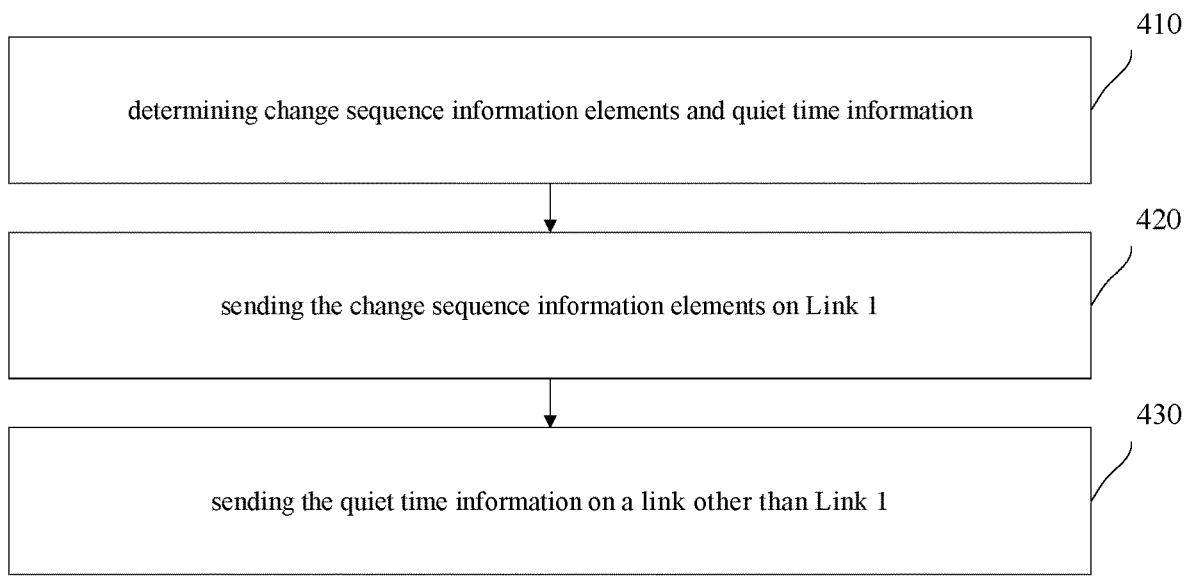
FIG. 4 is a flowchart of a communication method according to an example embodiment of the disclosure.

FIG. 4 is a flowchart of a communication method according to an example embodiment of the disclosure.

As shown in FIG. 4, at step 410, the change sequence information element and the quiet time information may be determined.

At step 420, the change sequence information element may be sent on Link 1. In the example embodiment, Link 1 is any link of the plurality of links supported by the AP. The change sequence information element may have the format as shown in Table 2, which is not limited in the example embodiments of the disclosure. For example, the change sequence information element may also have the format as shown in Table 1, which may be determined based on whether the receiver supports the multi-link communication.

In the embodiment of the disclosure, the change sequence information element may be sent on Link 1 along with on other links, or the change sequence information element may be sent on Link 1 only.

At step 430, the quiet time information may be sent on a link other than Link 1. The format of the quiet time information may be the same as the format of the Quiet Element (QE) defined in the existing standard. The format of the QE defined in the existing standard may be as shown in Table 4 below.

TABLE 4

| | | QE | | | |
|---|---|---|---|---|---|
| Element ID | Length | Quiet count | Quiet period | Quiet duration | Quiet offset |
| Octet 1 | 1 | 1 | 1 | 2 | 2 |

If there is a device that does not support the multi-link communication (e.g., an old-style STA that only support single-link communication), the quiet time information determined at step 410 and sent at step 430 may be QEs (as shown in Table 4) that can be recognized by both a device that supports the multi-link communication (e.g., an non-AP STA MLD) and a device that does not support the multi-link communication (e.g., an old-style STA).

For example, unlike the communication environment shown in FIG. 1, when the AP MLD is communicating with the device that does not support the multi-link communication (e.g., an old-style STA) on the link, i.e., in response to a presence of the device that does not support the multi-link communication (e.g., an old-style STA), according to the communication method, the quiet time information having a format defined according to the existing standard (i.e., the QEs shown in Table 4) is sent, to avoid the inability of the old STA to parse the quiet time information sent on the multiple links defined by the disclosure (i.e., the QEs shown in Table 3), which enables backward compatibility of the old STA.

According to the communication method, the change of the quiet time information (e.g., quiet period or quiet duration) of the AP MLD on the multiple links can be identified in the change sequence information element, and its specific information element is further defined to be broadcasted on one or more links, so that the quiet time of the AP can be obtained on one link or multiple links while achieving the backward compatibility of the old-style STA.

In addition, the communication method can reduce the signaling overhead, which allows the device to communicate on the multiple links, thereby increasing the network throughput.

Figure 5:
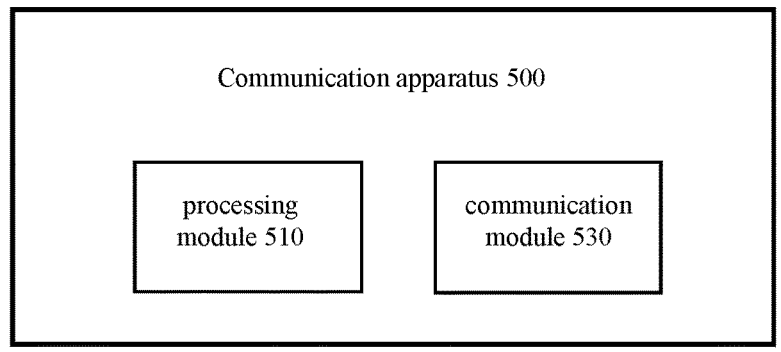
FIG. 5 is a diagram of a communication apparatus according to an example embodiment of the disclosure.

FIG. 5 is a diagram of a communication apparatus 500 according to an example embodiment of the disclosure.

As shown in FIG. 5, the communication apparatus 500 includes: a processing module 510 and a communicating module 530.

The processing module 510 is configured to determine a first message frame on one link, in which the first message frame includes a change sequence field, and a value of the change sequence field is configured to indicate quiet information for a plurality of links.

The communicating module 530 is configured to send the first message frame on at least one link of the plurality of links.

According to the example embodiment, the value of the change sequence field may be set to the first value for indicating a change of the quiet information for an access point of the plurality of links. For example, when the value of Change Sequence field is set to "00000101", its value is 5, and the value modulo 256 is used to identify that the quiet time information on the multiple links has changed.

According to the example embodiment of the disclosure, the change sequence field is a field included in a change sequence information element.

According to the example embodiment of the disclosure, the change sequence information element includes: a link ID, and the link ID corresponds to a link with changed quiet information.

According to the example embodiment of the disclosure, the first message frame further includes: quiet time information.

According to the example embodiment of the disclosure, the communicating module 520 is further configured to send quiet time information on the at least one link.

According to the example embodiment of the disclosure, the quiet time information includes: a second link ID, and the second link ID corresponds to a link with changed quiet information.

According to the example embodiment of the disclosure, the quiet time information includes: a BSS ID, and the BSS ID corresponds to a link with changed quiet information.

According to the example embodiment, the quiet time information may include a time offset corresponding to the link for sending the quiet time information (e.g., time shifting to reference link in Table 3), which is configured to represent the time difference between the link on which the quiet occurs and the link on which the quiet time information is sent currently. For example, the link on which the quiet occurs may be Link 1 shown in FIG. 1 with a corresponding time of T1. Assuming that the quiet time information is sent on all three links (Link 1 to Link 3) shown in FIG. 1, the time offset field in the quiet time information sent on the Link1 can be 0; the time offset field in the quiet time information sent on the Link2 may be s1; and the time offset field in the quiet time information sent on the Link2 may be s2. That is, the time at which each of Link 1 to Link 3 send the quiet time information may correspond to T1, T1+s1 and T1+s2 respectively, which is only exemplary and is not limited by the example embodiments of the disclosure. For example, the time offset field of the quiet time information may directly indicate the specific time corresponding to the link on which the quiet time information is sent. In an example, one link of the plurality of links supported by the AP may be set as the reference link (e.g., the link on which the quiet occurs or any other link), and when the quiet time information is sent on at least one link, the time offset corresponding to the link on which the quiet time information is sent may indicate the time offset of the link relative to the reference link at the time the quiet time information is sent, which is not limited in the example embodiments of the disclosure. For example, instead of setting the reference link, a reference time may be set, and then the time offset may correspond to a time offset of sending the quiet time information on each link relative to the reference time. In other words, when the quiet time information is sent on at least one link, the time offset in the quiet time information on each link of the at least one link may indicate a time offset of each link relative to the reference time.

According to the example embodiment of the disclosure, the quiet time information includes: an element ID indicating a type of the quiet time information.

According to the example embodiment of the disclosure, the communicating module 520 is further configured to send quiet time information on links other than the at least one link, in which a format of the quiet time information is the same as a format of QEs (as shown in FIG. 4).

The configuration and structure of the communication device 500 shown in FIG. 5 is only exemplary, which is not limited to the example embodiments of the disclosure. For example, the communicating device 500 may include more or fewer modules. Further, the modules described above may be implemented through a combination of software and/or hardware, which is not limited in the embodiments of the disclosure.

With the communicating device according to the example embodiments of the disclosure, the signaling overhead can be reduced, which allows the device to communicate on multiple links, thereby improving the network throughput.

In addition, the example embodiments of the disclosure also provide a multi-link communication method. The method may include: receiving a first message frame on at least one link, in which the first message frame includes a change sequence field, and a value of the change sequence field is configured to indicate quiet information for a plurality of links. For example, a device supporting the multi-link communication (e.g., a STA MLD) may receive the first message frame on at least one link, and a device supporting the single-link communication (e.g., an old STA) may receive the first message frame on one link.

According to the example embodiment of the disclosure, the value of the change sequence field is set to a first value for indicating a change of the quiet information for an AP of the plurality of links.

According to the example embodiment of the disclosure, the change sequence field is a field included in a change sequence information element.

According to the example embodiment of the disclosure, the change sequence information element includes: a link ID, and the link ID corresponds to a link with changed quiet information.

According to the example embodiment of the disclosure, the first message frame further includes: quiet time information.

According to the example embodiment of the disclosure, the method further includes: receiving quiet time information on the at least one link.

According to the example embodiment of the disclosure, the quiet time information includes: a second link ID, and the second link ID corresponds to a link with changed quiet information.

According to the example embodiment of the disclosure, the quiet time information includes: a BSS ID, and the BSS ID corresponds to a link with changed quiet information.

According to the example embodiment of the disclosure, the quiet time information includes: a time offset corresponding to a link for sending the quiet time information.

According to the example embodiment of the disclosure, the quiet time information includes: an element ID indicating a type of the quiet time information.

According to the example embodiment of the disclosure, the method further includes: receiving quiet time information on links other than the at least one link, in which a format of the quiet time information is the same as a format of a quiet element.

The change sequence information element, the quiet time information, and the QEs described above may be similar to those described with reference to Table 1 to Table 4, and the repetitive descriptions are omitted herein for brevity.

In an example embodiment, upon reception of the change sequence information element and/or the quiet time information, the STA may perform a corresponding quiet operation based on the change sequence information element and/or the quiet time information.

In addition, the example embodiments of the disclosure provide a multi-link communication apparatus. The apparatus may correspond to a STA or a control device on the STA side.

The apparatus may include: a receiving module, configured to receive a first message frame on at least one link, in which the first message frame includes a change sequence field, and a value of the change sequence field is configured to indicate quiet information for a plurality of links.

According to the example embodiment of the disclosure, the value of the change sequence field is set to a first value for indicating a change of the quiet information for an AP of the plurality of links has changed.

According to the example embodiment of the disclosure, the change sequence field is a field included in a change sequence information element.

According to the example embodiment of the disclosure, the change sequence information element includes: a link ID, and the link ID corresponds to a link with changed quiet information.

According to the example embodiment of the disclosure, the first message frame further includes: quiet time information.

According to the example embodiment of the disclosure, the receiving module is further configured to: receive quiet time information on the at least one link.

According to the example embodiment of the disclosure, the quiet time information includes: a second link ID, and the second link ID corresponds to a link with changed quiet information.

According to the example embodiment of the disclosure, the quiet time information includes: a BSS ID, and the BSS ID corresponds to a link with changed quiet information.

According to the example embodiment of the disclosure, the quiet time information includes: a time offset corresponding to a link for sending the quiet time information.

According to the example embodiment of the disclosure, the quiet time information includes: an element ID indicating a type of the quiet time information.

According to the example embodiment of the disclosure, the receiving module is further configured to: receive quiet time information on links other than the at least one link, in which a format of the quiet time information is the same as a format of QEs.

The change sequence information element, the quiet time information and the QEs described above may be similar to those described with reference to Table 1 to Table 4, the repetitive description of which is omitted herein for brevity.

In an example embodiment, the apparatus may further include other modules, for example, a processing module, which may be configured to perform a corresponding quiet operation based on receiving the change sequence information element and/or the quiet time information.

Figure 6:
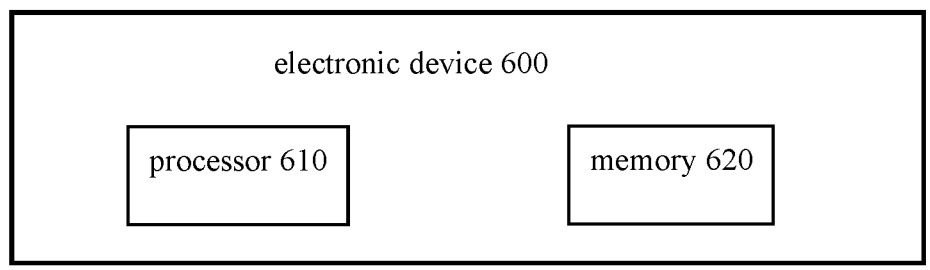
FIG. 6 is a diagram of an electronic device according to an example embodiment of the disclosure.

Based on the same principles as the method provided in the embodiments of the disclosure, the embodiments of the disclosure also provide an electronic device. FIG. 6 is a diagram of an electronic device 600 according to an example embodiment of the disclosure. The electronic device 600 includes a processor 610 and a memory 620 storing computer readable instructions (which may also be referred to as computer programs). When the computer readable instructions are executed by the processor 610, the method described with reference to FIGS. 2-4 is implemented.

The embodiments of the disclosure also provide a computer-readable storage medium having computer programs stored thereon. When the computer programs are executed by the processor, the method described with reference to FIGS. 2-4 is implemented.

In exemplary embodiments, the processor may be a logic box, a module or a circuit for implementing or executing various exemplary embodiments described in the disclosure, for example, a Central Processing Unit (CPU), a general processor, a Digital Signal Processor (DSP), an Application Specific Integrated Circuit (ASIC), a Field Programmable Gate Array (FPGA), or other programmable logic devices, transistor logic devices, hardware components or any combination thereof. The processor may also be a combination used to implement a computing function, for example, a combination consisting of one or more microprocessors, and a combination consisting of DSPs and microprocessors.

In the example embodiments, the memory may be, for example, a Read Only Memory (ROM), a Random Access Memory (RAM), an Electrically Erasable Programmable Read Only Memory (EEPROM), a Compact Disc Read Only Memory (CD-ROM) or other optical disc memories, optical disk memories (including compact disc, laser disc, CD-ROM, digital general disc, and Blu-ray disc), disk storage mediums or other magnetic storage devices, or any other medium that can be used to carry or store program codes in the form of instructions or data structures and can be accessed by a computer, which is not limited herein.

It should be understood that although steps in the flowchart of the accompanying drawings are shown sequentially as indicated by the arrows, the steps are not necessarily performed sequentially in the order indicated by the arrows. Unless explicitly stated otherwise in the disclosure, there is no strict sequential limitation on the execution of these steps, which may be performed in any other order. In addition, at least some of the steps in the flowchart of the accompanying drawings may include a plurality of sub-steps or a plurality of phases, which are not necessarily executed at the same time, but may be executed at different times. The execution order is not necessarily sequential, and the steps can be performed alternately or alternatively with other steps or at least part of sub-steps or phases of other steps.

Although the disclosure has been shown and described with reference to the embodiments of the disclosure, it will be understood by those skilled in the art that various changes in form and detail can be made without departing from the scope of the disclosure. Accordingly, the scope of the disclosure should not be limited by the embodiments, but should be defined by the appended claims and their equivalents.

What is claimed is:

1. A multi-link communication method, performed by an access point (AP), the method comprising:
   determining a first message frame, wherein the first message frame comprises a change sequence field, and a value of the change sequence field is configured to indicate quiet information for a plurality of links; and
   sending the first message frame on at least one link of the plurality of links to at least one station (STA);
   wherein the value of the change sequence field is set to a first value, for indicating a change of the quiet information for the plurality of links, the first message frame further comprises quiet time information, and the quiet time information comprises a second link ID, wherein the second link ID corresponds to a link with changed quiet information.

2. The method of claim 1, wherein the change sequence field is included in a change sequence information element.

3. The method of claim 2, wherein the change sequence information element comprises: a first link ID, wherein the first link ID corresponds to a link with changed quiet information.

4. The method of claim 1, further comprising:
   sending the quiet time information on the at least one link.

5. The method of claim 1, wherein the quiet time information comprises a basic service set ID, wherein the basic service set ID corresponds to a link with changed quiet information.

6. The method of claim 1, wherein the quiet time information comprises a time offset corresponding to a link for sending the quiet time information.

7. The method of claim 1, wherein the quiet time information comprises: an element ID indicating a type of the quiet time information.

8. The method of claim 1, further comprising:
   sending the quiet time information on at least one link other than the at least one link on which the first message frame is sent; wherein
   a format of the quiet time information is the same as a format of a quiet element.

9. A multi-link communication method, performed by a station (STA), the method comprising:
   receiving a first message frame on at least one link sent by at least one access point (AP), wherein the first message frame comprises a change sequence field, and a value of the change sequence field is configured to indicate quiet information for a plurality of links; wherein the value of the change sequence field is set to a first value, for indicating a change of the quiet information for the plurality of links, the first message frame further comprises quiet time information, and the quiet time information comprises a second link ID, wherein the second link ID corresponds to a link with changed quiet information.

10. The method of claim 9, wherein the change sequence field is included in a change sequence information element.

11. The method of claim 10, wherein the change sequence information element comprises: a first link ID, wherein the first link ID corresponds to a link with changed quiet information.

12. The method of claim 9, further comprising: receiving the quiet time information on the at least one link.

13. An electronic device comprising:
   a processor; and
   a memory storing computer programs executable by the processor, wherein when the computer programs are executed by the processor, the method of claim 1 is performed.

14. An electronic device comprising:
   a processor; and
   a memory storing computer programs executable by the processor, wherein when the computer programs are executed by the processor, the processor is configured to:
   receive a first message frame on at least one link sent by at least one access point (AP), wherein the first message frame comprises a change sequence field, and a value of the change sequence field is configured to indicate quiet information for a plurality of links; wherein the value of the change sequence field is set to a first value, for indicating a change of the quiet information for the plurality of links, the first message frame further comprises quiet time information, and the quiet time information comprises a second link ID, wherein the second link ID corresponds to a link with changed quiet information.

\* \* \* \* \*